United States Patent  
Deetz et al.

(10) Patent No.: US 7,966,484 B1
(45) Date of Patent: Jun. 21, 2011

(54) AUTOMATIC ALTERNATING BOOTABLE STORAGE DEVICES BETWEEN DIFFERENT KINDS OF BOOT FILES

(75) Inventors: Randell Deetz, Costa Mesa, CA (US); Kenneth Burke, Laguna Hills, CA (US); Sunthorn Srichoo, Costa Mesa, CA (US); Gary William Streuter, San Clente, CA (US); James Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 0 days.

(21) Appl. No.: 12/686,259

(22) Filed: Jan. 12, 2010

Related U.S. Application Data

(60) Provisional application No. 61/144,657, filed on Jan. 14, 2009.

(51) Int. Cl.
 *G06F 9/00* (2006.01)
 *G06F 15/177* (2006.01)
 *G06F 13/00* (2006.01)
 *G06F 11/00* (2006.01)

(52) U.S. Cl. ............... 713/1; 713/2; 709/220; 710/104; 714/6.11; 714/15

(58) Field of Classification Search ............... 713/1, 2; 709/220; 710/104; 714/6, 15, 6.11
See application file for complete search history.

(56) References Cited

U.S. PATENT DOCUMENTS

| | | | |
|---|---|---|---|
| 7,017,039 B2 * | 3/2006 | Hensley | 713/2 |
| 7,434,042 B2 * | 10/2008 | Oguma | 713/2 |
| 7,694,123 B2 * | 4/2010 | Prasse et al. | 713/2 |
| 7,849,300 B2 * | 12/2010 | Hsu et al. | 713/1 |
| 7,861,117 B2 * | 12/2010 | Coronado et al. | 714/36 |
| 2009/0013409 A1 * | 1/2009 | Wenzinger et al. | 726/24 |

* cited by examiner

*Primary Examiner* — Stefan Stoynov
(74) *Attorney, Agent, or Firm* — Law Office of Scott C. Harris

(57) ABSTRACT

Backup for a computer system that automatically creates files that will allow the user the choice of which storage device with a bootable operating system to boot. An embodiment may automatically detect if the operating system is any of a plurality of versions of Windows XP or Windows Vista and create the appropriate files identifying the storage devices containing bootable operating system of the right types for use with these operating systems.

8 Claims, 8 Drawing Sheets

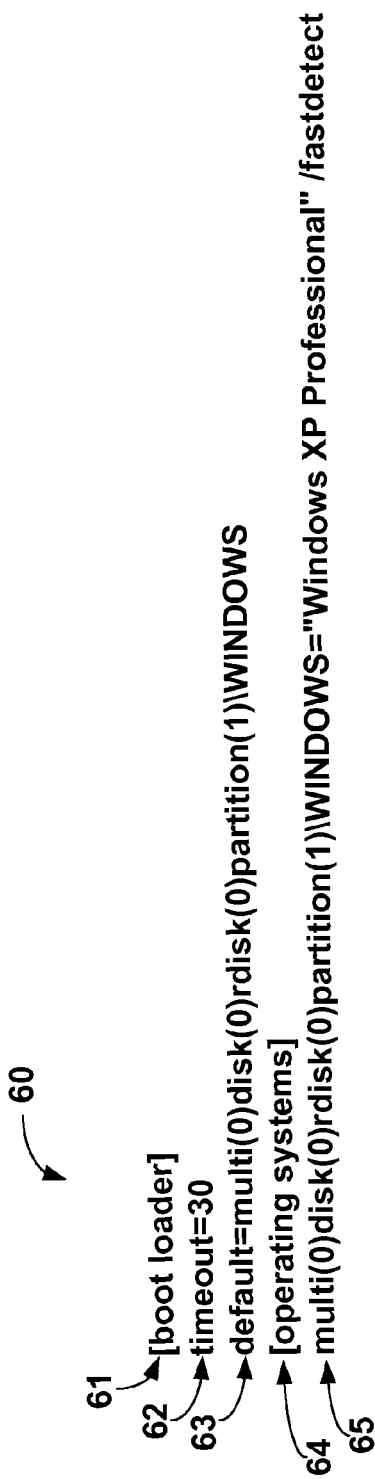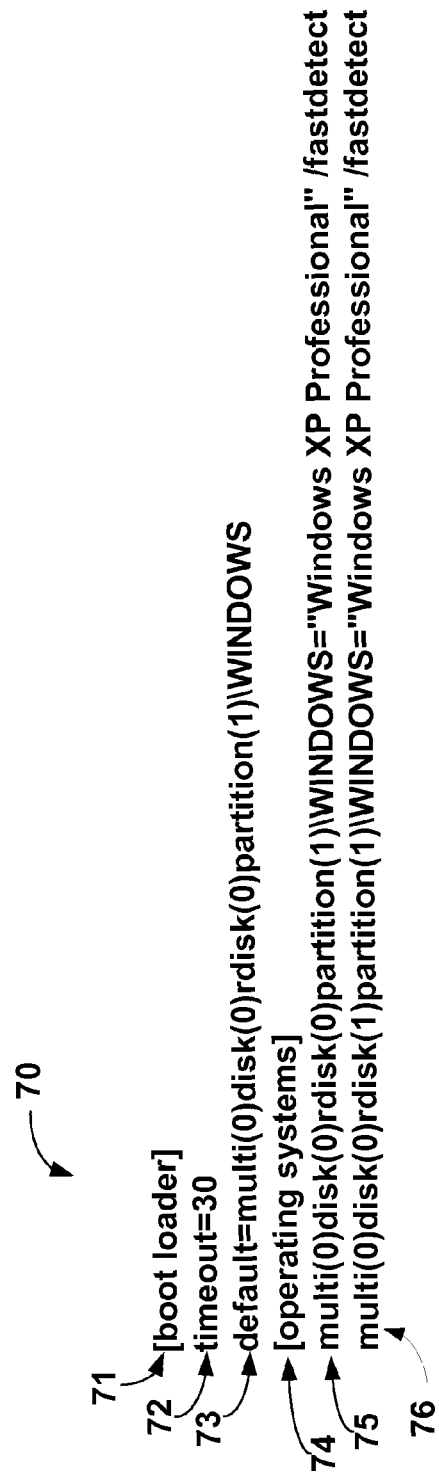

AUTOMATIC ALTERNATING BOOTABLE STORAGE DEVICES BETWEEN DIFFERENT KINDS OF BOOT FILES

This application claims priority from provisional application No. 61/144,657, filed Jan. 14, 2009, the entire contents of which are herewith incorporated by reference.

BACKGROUND

1. Field of the Embodiments

The present embodiments relates generally to software programs used for creating a "bare metal" backup of operating system hard disk drives and for performing a bare metal restore of the backup drive to a failed system drive.

2. Description of Prior Art

Different systems are used for backup of operating systems to backup drives. CMS Products, Inc, the assignee of this application, makes a products called "Bounceback" that does complete system and operating system backups.

SUMMARY OF THE EMBODIMENTS

One object is to allow a calling software program running on a Windows Personal Computer that is a desktop computer, laptop computer, or server to automatically create files that will allow the user the choice of which storage device with a bootable operating system to boot.

Another object is to automatically detect if the operating system is any of a plurality of versions of Windows XP or Windows Vista and create the appropriate files identifying the storage devices containing bootable operating system of the right types for use with these operating systems.

BRIEF DESCRIPTION OF THE DRAWINGS

Embodiments of the present embodiments are illustrated by way of example, and not by way of limitation. The following figures and the descriptions both brief and the detailed descriptions of the embodiments refer to similar elements and in which:

FIG. 3A is a listing of a BOOT.INI file where a single bootable drive is present in a Windows XP based personal computer or a Windows XP based server.

FIG. 3B is a listing of a BOOT.INI file where a two bootable drives are present in a Windows XP based personal computer or a Windows XP based server.

DETAILED DESCRIPTION

Windows XP and VISTA each provide a similar set of services for the software applications they manage and control. There are subtle differences between the two operating systems that necessitate differences in how the embodiments creates the files that tell the operating system, at boot time, which storage devices have bootable versions of the operating system(s).

FIG. 1 depicts a typical Windows hardware configuration that would use the embodiments. The hardware may constitute a personal computer such as a desktop or laptop or a file server. Each of the hardware configurations could run either Windows XP or Windows Vista operating systems.

Figure 1A:
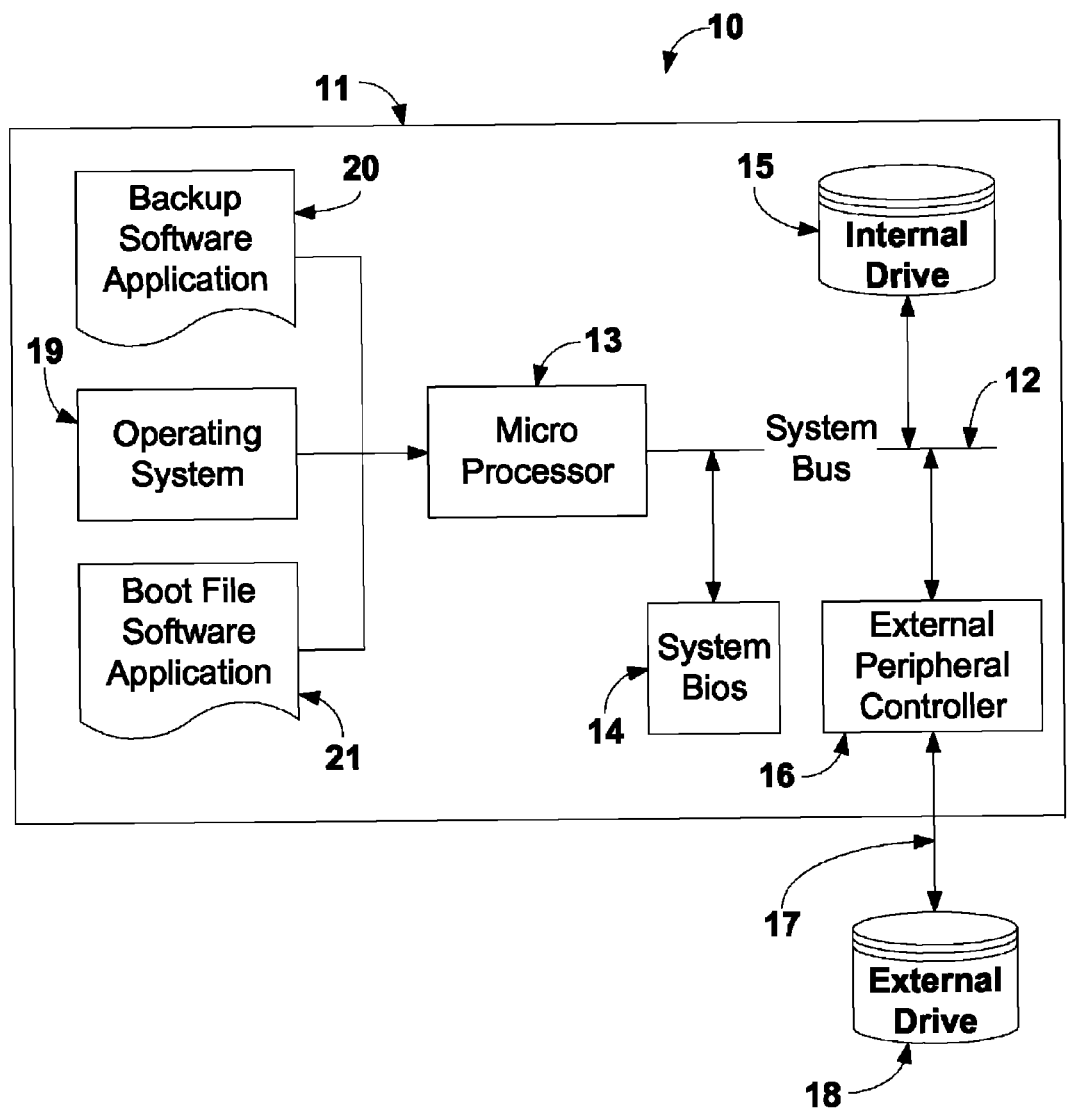
FIG. 1A is a depiction of a computer that has or can have the software described in the embodiments running.
Figure 1B:
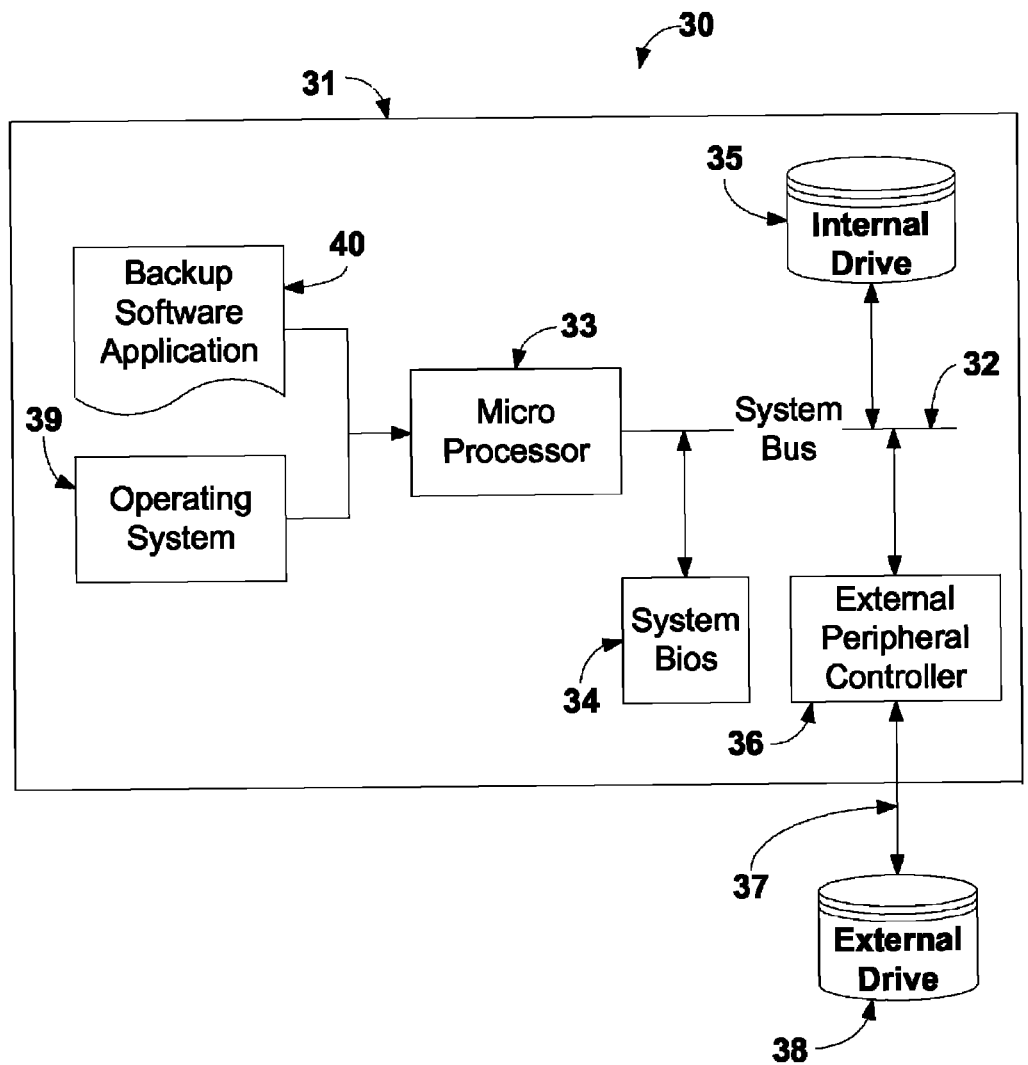
FIG. 1B is a depiction of a personal computer or server that would host the embodiments where the embodiments is linked into the software application that uses it.

In FIGS. 1A and 1B, a personal computer or server 10 is shown, that would host the software and/or other techniques described according to the embodiments. Computer system 11 has a system bus 12 to which hardware components of the system are connected. Hardware components connected to system bus 12 include microprocessor 13, system drive 15, system BIOS 14, and external peripheral controller 16. External drive 18 is connected to external peripheral controller 16 through external bus 17. External bus 17 is any of a plurality of external buses such as, but not limited to, IEEE-1394, eSATA or USB. Software that controls the hardware components of computer system 11 are operating system 19, backup software application 20, and boot file software application 21. System memory is not shown in FIGS. 1A and 1B, however those of ordinary skill in the art understand that memory and other components may be included in the computer. Software such as operating system 19, backup software application 20, and boot file software application 21 are contained in and executed in system memory by microprocessor 13.

In some embodiments, backup software application 20 and boot file software application 21 may be linked together at software build time. FIG. 1B shows an alternative where computer system 31 has backup software application 40 and where backup software application contains the functionality of the embodiments previously shown as computer system 11 and boot file software application 21.

Figure 2:
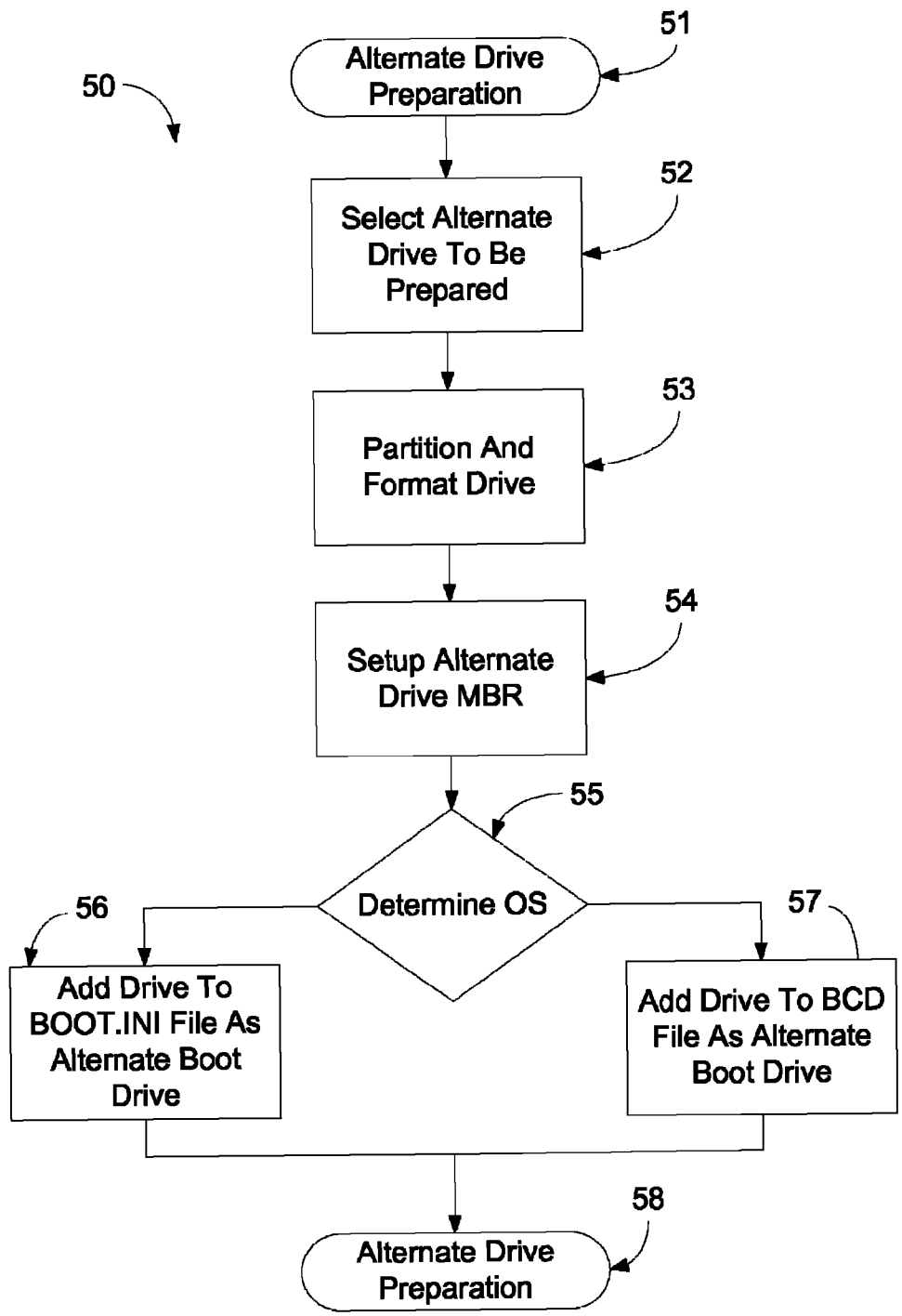
FIG. 2 is a flow chart depicting the second or alternate drive partitioning and formatting including the creation of the boot dot ini file or BCD Registry file.
Figure 4:
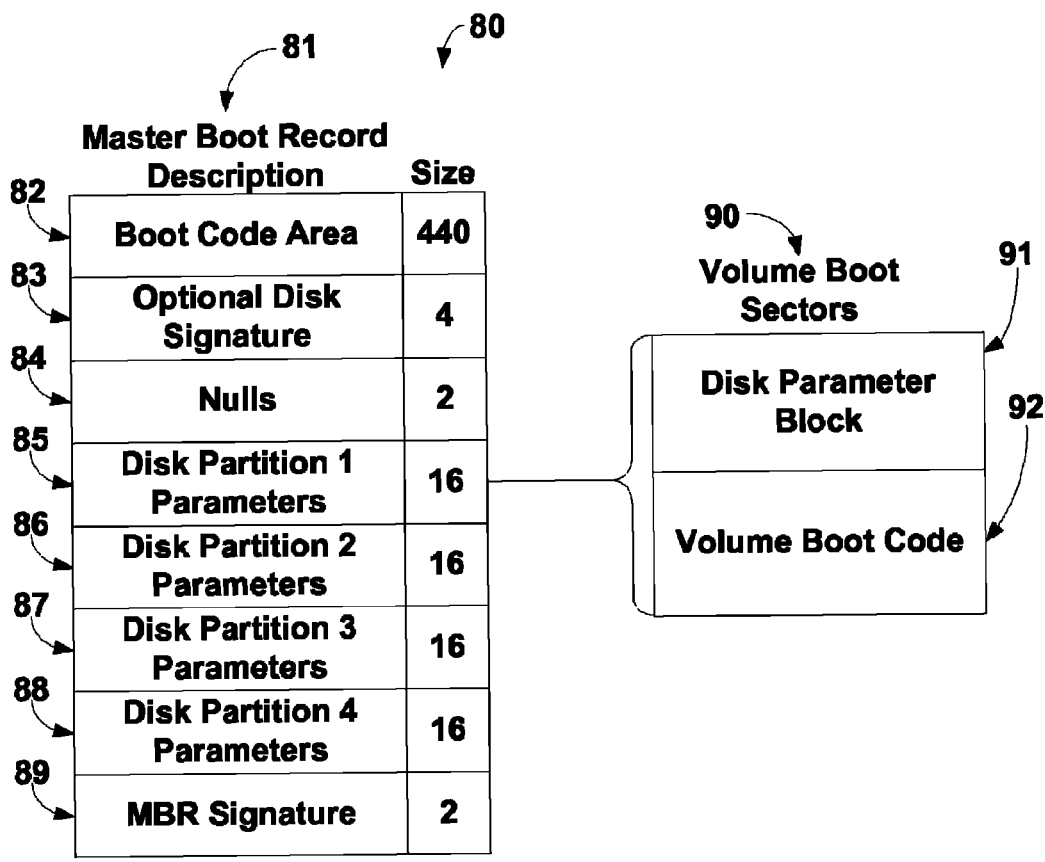
FIG. 4 is a flow chart depicting the master boot record and other such records.
Figure 5:
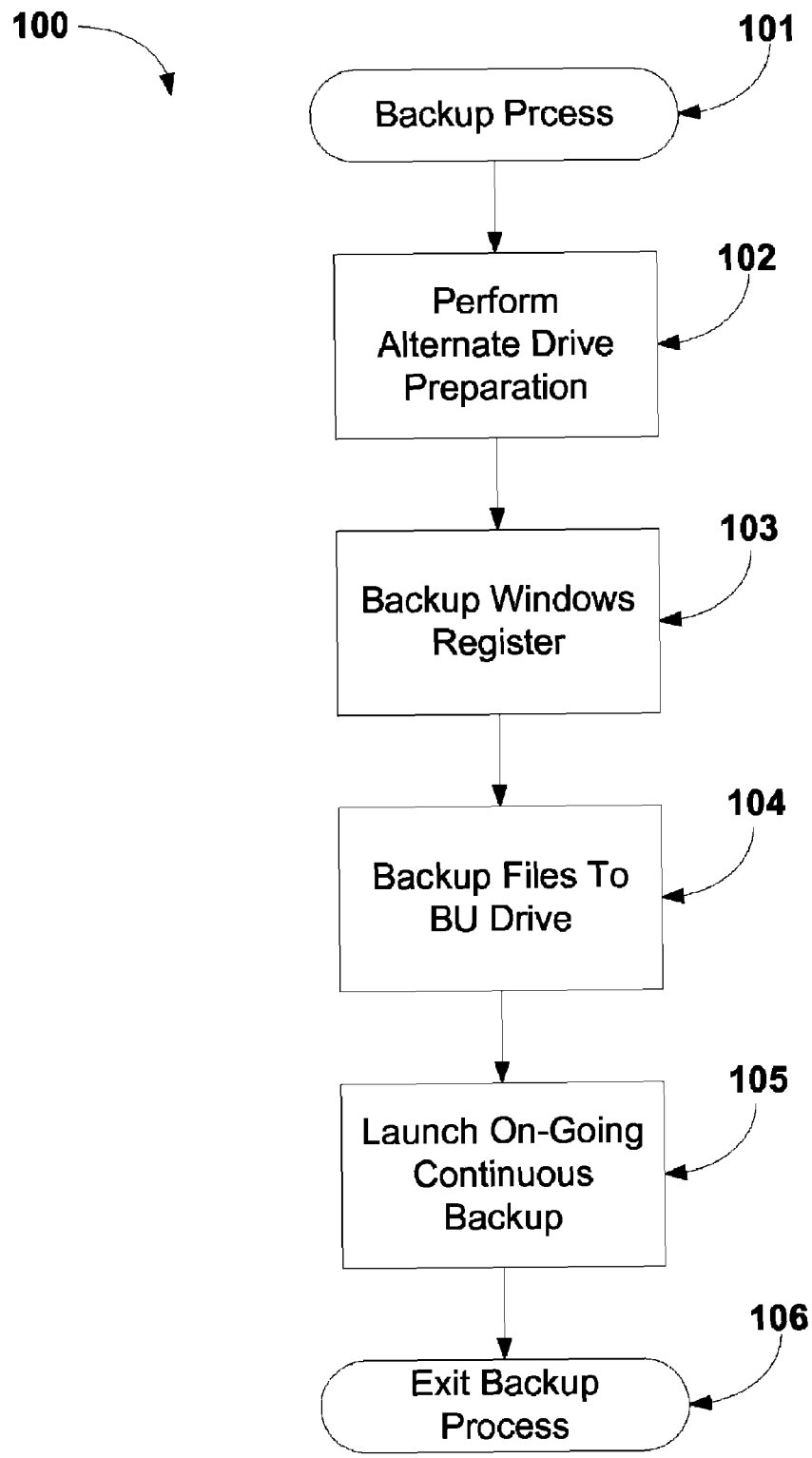
FIG. 5 is a flow chart depicting the backup process.

FIG. 2 depicts the sequence used by a typical backup software application depicted as 20 or 40 in FIGS. 1A and 1B to prepare an alternate drive 18 or 28. In this sequence shown in FIG. 2, alternate drive preparation 51 can also be called a "backup process". Once alternate drive preparation 51 is called, processing block select alternate drive to be prepared 52 will query the user through some means such as a dialog box requesting the ID of the alternate drive. For the purpose of this description, the alternate drive identified by the user will be external drive 18. The user identifies external drive 18 as the alternate drive processing block partition. A partition and format drive 53 queries the user through some means such as a dialog box requesting the user to specify the number of partitions and the size of the partitions to be placed on external drive 18. Once the user specifies the number of partitions and size of the partitions to be placed on external drive 18 partition and format drive 53 will perform a partitioning operation on external drive 18 then format each of the partitions.

After the partitions have been created and formatted by partition and format drive 53, setup alternate drive MBR 54 creates a master boot record (MBR) and writes it on the bootable partition of external drive 18.

Once setup alternate drive MBR 54 has written the MBR out to the bootable partition of external drive 18, determine OS 55 makes a determination as to the operating system. This would typically be performed once at application install time. For the sake of clarity, this description shows the decision being made at run time. If the resident operating system is Windows XP, then determine OS operation 55 passes control to 56, which adds the drive to BOOT.INI file as alternate boot drive 56. This processing block adds external drive 18, which in this description is drive 1. Typically internal drive 15 will be set as drive 0 by the operating system and additional drives set to drive 1, drive 2, etc.

FIG. 3A shows a typical BOOT.INI file 60 for a Windows XP system with one boot drive. This file describes how to boot in Windows XP. Typically, the user would have to manually edit this file to add drive 1 as a bootable drive. Non sophisticated users, which make up majority of personal computer users, would be forced to manually edit this file to add an additional boot drive.

Note that in BOOT.INI file 60, the default boot drive is shown as 63 which declares disk 0, partition 1 as the bootable partition and that it is a Windows system. Also note 64 which declares that operating systems follow. 65 shows that the operating system on disk 0 partition 1 is a Windows XP Professional operating system.

FIG. 3B shows another typical BOOT.INI file as 70. As compared with boot.ini 60, 76 in boot.ini 70declares that an additional operating system is resident on disk 1 partition 1 and that the operating system is Windows XP Professional. Sufficient literature exists on the internet to suggest that entering the information for 76 would be beyond the capability of the average user.

If determine OS 55 in FIG. 2 determines that the operating system is VISTA, it will pass control to processing block 57 to add drive to BCD file as an alternate boot drive. Windows VISTA replaces the boot.ini that was used by NTLDR (NT loader), and is used by Microsoft's new Windows Boot Manager. Boot Configuration Data (BCD) is stored in a data file formatted in the same way as a Windows registry hive. A system utility is resident in the Windows VISTA operating system to allow a user to manually edit the BCD file. Finding this edit utility is typically beyond the capability of even intermediate level users. Microsoft has an on-line help page located at: the website at technet.microsoft.com/en-us/library/cc709667.aspx that explains and provides the commands available to a user for editing the BCD file. Anyone other than an Information Technology specialist will experience great difficulty even understanding the options listed on the help page.

The operating system also provides an applications programming interface (API) to the edit utility which allows software application programs to make calls to the utility to effect changes in the file. The embodiments will, based on data provided by the application calling it, in turn make API calls to the edit utility and effectively add external drive 18 (typically drive 1) to the BCD file as the alternate drive.

Once the BOOT.INI file or the BCD file has been updated with the appropriate data in the FIG. 2 flowchart, control will be passed to exit drive preparation 58 which returns control to the calling application (backup software application 20) or function contained in backup software application 40.

Figure 6:
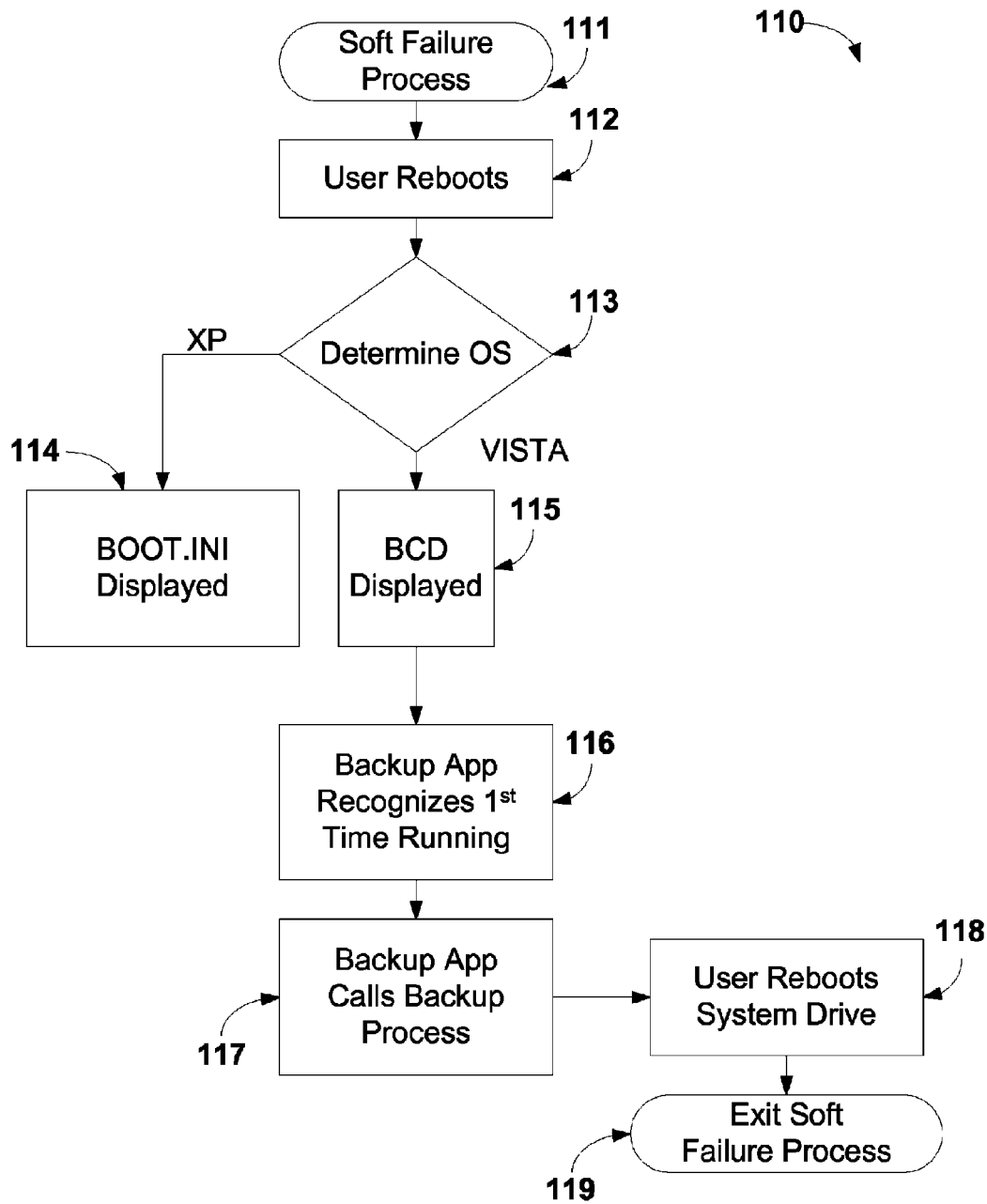
FIG. 6 is a flow chart depicting the soft failure process.

Now referencing FIG. 6 depicting how the techniques of the embodiments are used during the soft failure recovery process. Soft failures occur when internal drive 15 boots to the point of displaying BOOT.INI file 70 or the same data contained in the BCD file but will not completely boot the operating system. This condition is known as a soft failure or soft crash of the operating system.

When this condition occurs, the user initiates soft failure process 111. The sequence of steps begins with a user reboot at 112. The process advances to determine OS 113, which determines the current operating system. If the current operating system is Windows XP, BOOT.INI displayed 114 will be executed. If the current operating system is Widows VISTA, BCD Displayed 115 will be executed. Assuming for the initial example that the current operating system is Widows XP, BOOT.INI 114 is executed. This processing block will display the BOOT.INI file. Once the user makes this selection, the operating system will start the boot process for the operating system resident on external drive 18 (disk 1 partition 1; 76). If the operating system is VISTA, determine OS 113 will pass control to BCD displayed 115. This processing block will display the BCD file. Once the user makes this selection, the operating system will start the boot process for the operating system resident on external drive 18 (disk 1 partition 1).

After the system reboots using the operating system resident on external drive 18, the operation will, once it is completely booted, typically start the backup software application 21 (FIG. 1A) or 40 (FIG. 1B). Also typically, backup software application can recognize when it is run for the first time on the alternate drive. This is depicted in FIG. 6 as 116, where the backup app recognizes first time running. The backup process 101 is called by backup app calls backup process 117. This sequence allows the user to restore internal drive 15.

Typically after backup process 101 has completed and control is returned, user reboots internal drive 118 is executed and the system begins the reboot process by either displaying the BOOT.INI file (Windows XP) or the BCD file (Windows VISTA).

An other case for system failures is a hard failure where internal drive 15 suffers either a mechanical failure or a electrical failure and will not rotate or otherwise provide its data. If this is the case, then the system BIOS determines the boot order of the bootable storage devices residing in a personal computer or server. The boot order settings in the BIOS are saved in a CMOS or non-volatile memory which was historically called CMOS RAM or just CMOS. Some versions of BIOS will attempt to boot, for example, from the system drive (typically drive j), an optical CD/DVD drive, then from whichever drive is designated Drive 1, then Drive 2, and so on. Some versions of the system BIOS only attempt to boot from the first designated disk drive which again is usually drive 0. Both of these scenarios are described in the following and reference in FIG. 7.

If the user determines that the system drive is physically not operational, then the user typically replaces the drive with a fresh drive and boot the system to the backup drive. If the user determines that the drive is spinning but not booting, the most probable cause is the master boot record was damaged. If the user needs to use the computer and does not care about reconstructing a new system drive then the system can be rebooted to the backup drive and used as though it were the system drive. The embodiments accommodates all 3 scenarios which are described in the following.

Figure 7:
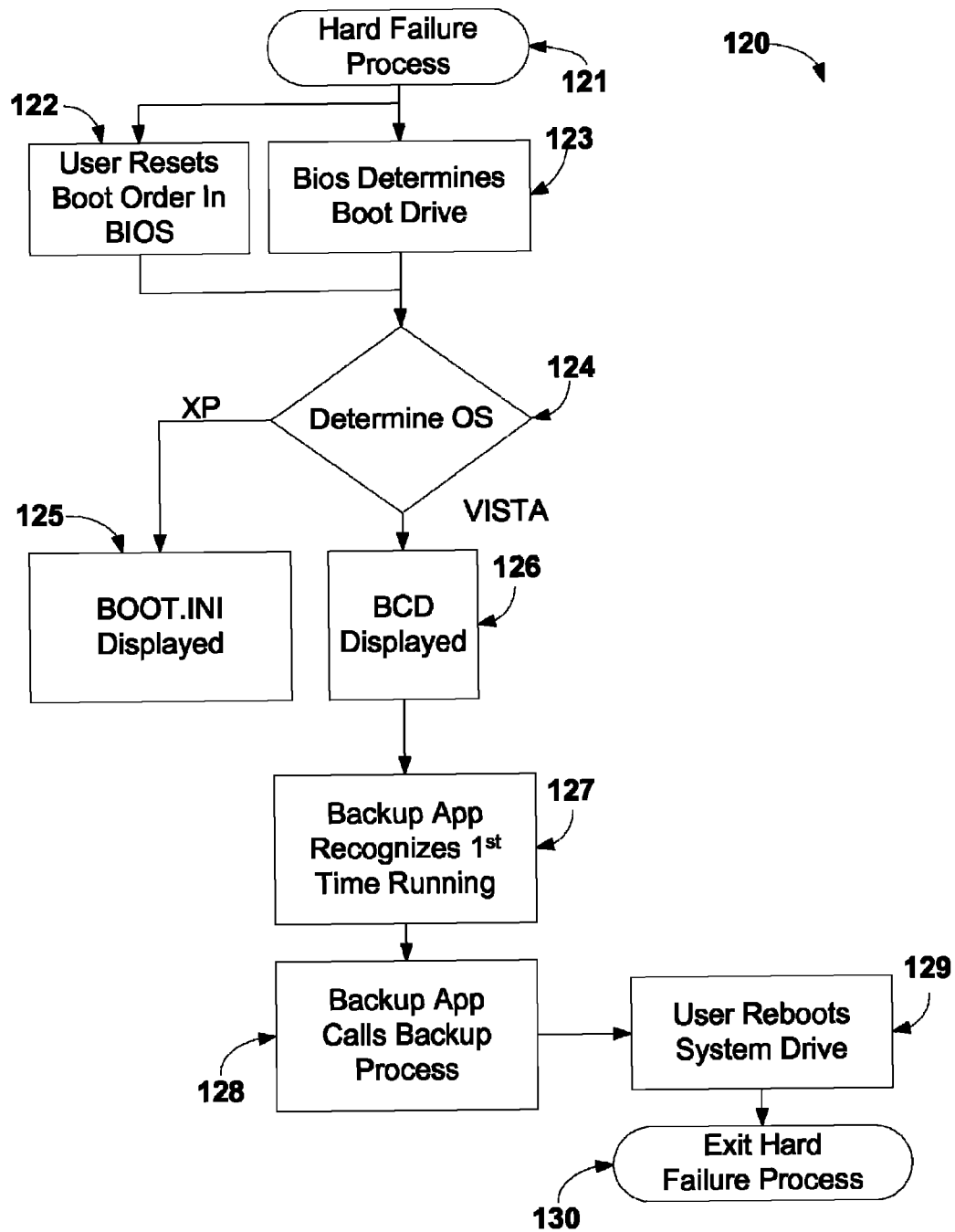
FIG. 7 is a flow chart depicting what happens when the hard drive fails.

FIG. 7 depicts the above 3 scenarios and all of them operating with the embodiments. Hard failure process 121 can follow either of the entry scenarios where a hard failure has occurred and the BIOS is of a version that requires the user to manually reset the boot order so that the alternate drive, external drive 18 in this case, can be booted. This step occurs in user resets boot order in BIOS 122. If the BIOS is of the type that waits for some predetermined period of time and if the boot process has not started, it attempts to boot from the next storage device in the boot list saved in CMOS memory. If this is the case, then this step occurs in BIOS determines boot order 123. Processing blocks 122 and 123 both cause the system to reboot and processing begins again during the reboot at determine OS 124.

If the current operating system is Windows XP, BOOT.INI displayed 125 will be executed. If the current operating system is Widows VISTA, BCD Displayed 126 will be executed. Assuming for the initial example that the current operating system is Widows XP, BOOT.INI 125 is executed. This processing block will display the BOOT.INI file. Once the user makes this selection, the operating system will start the boot process for the operating system resident on external drive 18 (disk 1 partition 1; 76). If the operating system is VISTA, determine OS 124 will pass control to BCD displayed at 126. This processing block will display the BCD file. Once the user makes this selection, the operating system will start the boot process for the operating system resident on external drive 18 (disk 1 partition 1).

After the system reboots using the operating system resident on external drive 18, the operation will, once it is completely booted, typically start the backup software application 21 (FIG. 1A) or 40 (FIG. 1B). Also typically, backup software application can recognize when it is run for the first time on the alternate drive. This is depicted in FIG. 7 as 127 backup app recognizes first time running 127. This process block then passes control to backup app and calls backup process 128. The backup process 101 is called by backup app calls backup process 128. This sequence allows the user to restore internal drive 15. Typically after backup process 101 has completed and control is returned, 128 is executed where the user reboots internal drive 128. This causes the system to begin the reboot process by either displaying the BOOT.INI file (Windows XP) or the BCD file (Windows VISTA).

During this scenario, the user could have stopped the process at 127 backup app recognizes 1st time running 127 and manually exited the application and used the computer system with external drive 18 running as the system drive. The embodiments provide the user the ability to reboot the system after a failure from any storage device with a bootable operating system and it provides the user the ability to restore a failed system drive without having to manually edit any boot file as part of the process.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other operating systems may be supported in analogous ways, and other forms of telling the software and/or operating system where to boot.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
   a personal computer system containing at least one system storage device and at least one additional storage device;
   said personal computing system having any of a plurality of operating systems;
   said personal computing system running a startup sequence that uses a first file to specify an identification of bootable devices attached to said personal computer system; and
   said personal computer system running a first software application using said operating system that, when called with the identification of said at least one additional storage device, operates to determine which of a plurality of different operating systems is being used, determines which of a plurality of files defines the information in said first file, and to automatically alter said first file such that the at least one additional storage device is listed in said first file as an additional bootable storage device hosting a backed up operating system.

2. The system of claim 1 where said first software application backs up said operating system, and allows starting said personal computer system using said backed up operating system.

3. A system as in claim 1, wherein said operating system is a windowing operating system, and said first file is a boot.ini file.

4. A system as in claim 1, wherein said operating system is a windowing operating system, and said first file is a BCD file.

5. A method, comprising:
   operating a personal computer system using an operating system;
   running a startup sequence that uses a first file to specify an identification of at least one bootable storage device attached to said personal computer system;
   starting said personal computer system using a first boot device; and
   a first software application determining a new bootable device wherein resides at least one backed up and bootable operating system, and responsive to said determining, determining which of a plurality of different operating systems is being used, and determining which of a plurality of files defines the information in said first file, and automatically altering said first file such that the at least one bootable storage device is listed in said first file as an additional bootable storage device.

6. The method of claim 5 where said first software application backs up said operating system, and allows starting said personal computer system using the backed up operating system, and specifies said bootable storage device that backs up the operating system in said first file.

7. A method as in claim 5, wherein said operating system is a windowing operating system, and said first file is a boot.ini file.

8. A method as in claim 5, wherein said operating system is a windowing operating system, and said first file is a BCD file.

* * * * *